US010272870B2

(12) United States Patent
Festag

(10) Patent No.: US 10,272,870 B2
(45) Date of Patent: Apr. 30, 2019

(54) AIRBAG SYSTEM FOR A VEHICLE

(71) Applicant: LEAR CORPORATION, Southfield, MI (US)

(72) Inventor: Peter Festag, Erding (DE)

(73) Assignee: Lear Corporation, Southfield, MI (US)

( * ) Notice: Subject to any disclaimer, the term of this patent is extended or adjusted under 35 U.S.C. 154(b) by 107 days.

(21) Appl. No.: 15/290,451

(22) Filed: Oct. 11, 2016

(65) Prior Publication Data

US 2017/0101074 A1   Apr. 13, 2017

Related U.S. Application Data

(60) Provisional application No. 62/240,697, filed on Oct. 13, 2015.

(30) Foreign Application Priority Data

Oct. 5, 2016   (DE) .................... 20 2016 105 511 U

(51) Int. Cl.
| | |
|---|---|
| *B60R 21/2165* | (2011.01) |
| *B60R 21/231* | (2011.01) |
| *B60R 21/21* | (2011.01) |
| *B60R 13/02* | (2006.01) |

(52) U.S. Cl.
CPC ...... *B60R 21/2165* (2013.01); *B60R 13/0237* (2013.01); *B60R 13/0275* (2013.01); *B60R 21/21* (2013.01); *B60R 21/23138* (2013.01); *B60R 2013/0287* (2013.01)

(58) Field of Classification Search
CPC .......... B60R 21/2165; B60R 21/23138; B60R 21/21; B60R 13/0237; B60R 13/0275; B60R 2013/0287
See application file for complete search history.

(56) References Cited

U.S. PATENT DOCUMENTS

| | | | | |
|---|---|---|---|---|
| 5,066,039 | A * | 11/1991 | Shitanoki | ................ B60R 21/01 149/3 |
| 5,230,530 | A * | 7/1993 | Iriyama | ................ B60R 21/205 280/732 |
| 6,364,346 | B1 * | 4/2002 | Preisler | ................ B60R 13/025 280/728.2 |
| 6,733,713 | B2 * | 5/2004 | Takahashi | ........... B29C 45/0081 264/328.12 |
| 7,530,595 | B2 | 5/2009 | Naruse et al. | |

(Continued)

FOREIGN PATENT DOCUMENTS

FR   2917356 A1   12/2008

*Primary Examiner* — Paul N Dickson
*Assistant Examiner* — Joselynn Y Sliteris
(74) *Attorney, Agent, or Firm* — Brooks Kushman P.C.

(57) ABSTRACT

An airbag system for a vehicle includes a trim component having an A-side configured to face into a passenger compartment of the vehicle toward a vehicle seat and a B-side configured to face away from the passenger compartment. A base plate has a cavity disposed therein and is configured for attachment to the B-side of the trim component to form an at least substantially closed cavity configured to receive an airbag arrangement therein. The base plate has an outer perimeter generally conforming to an outer perimeter of the trim component. An airbag arrangement includes an inflatable airbag and an inflator configured to inflate the airbag, and may be disposed in the substantially closed cavity.

12 Claims, 5 Drawing Sheets

(56) References Cited

U.S. PATENT DOCUMENTS

| | | | |
|---|---|---|---|
| 7,556,285 B1* | 7/2009 | Hayashi | B60R 21/2165 |
| | | | 280/728.3 |
| 7,798,519 B2 | 9/2010 | Kawabe et al. | |
| 8,336,910 B1* | 12/2012 | Kalisz | B60R 13/0243 |
| | | | 280/730.1 |
| 8,752,861 B2* | 6/2014 | Fukawatase | B60N 2/289 |
| | | | 280/728.2 |
| 9,975,515 B2* | 5/2018 | Tanabe | B60N 2/986 |
| 2003/0119393 A1* | 6/2003 | Sanae | B29C 37/0057 |
| | | | 442/76 |
| 2003/0132621 A1* | 7/2003 | Arieth | B60R 21/205 |
| | | | 280/732 |
| 2015/0061266 A1 | 3/2015 | Jordan et al. | |
| 2017/0174169 A1* | 6/2017 | Tanabe | B60R 21/207 |
| 2019/0001914 A1* | 1/2019 | Yaegashi | B60R 21/2165 |

* cited by examiner

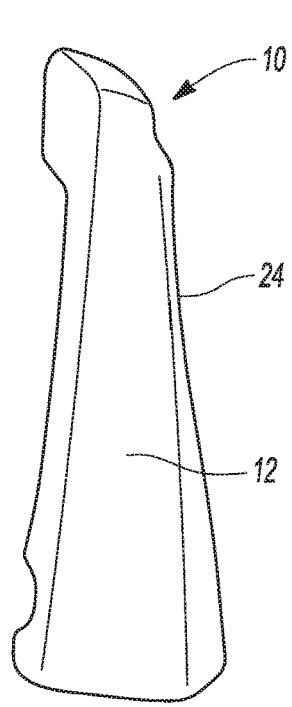
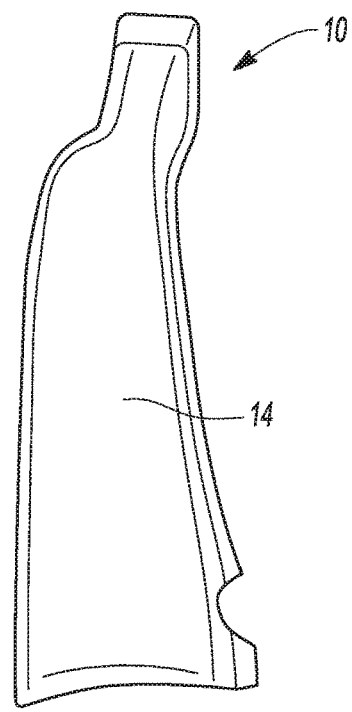
Fig-1A          Fig-1B
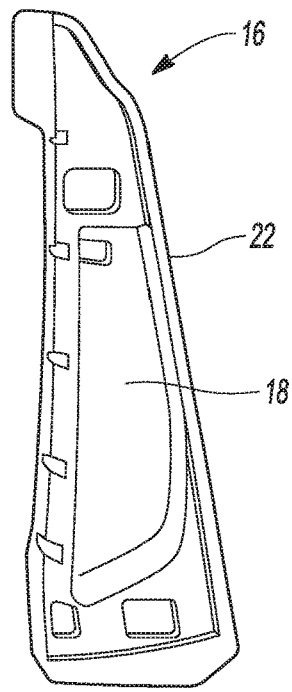
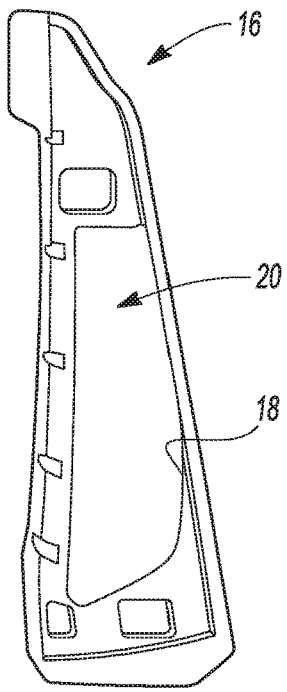
Fig-2A          Fig-2B

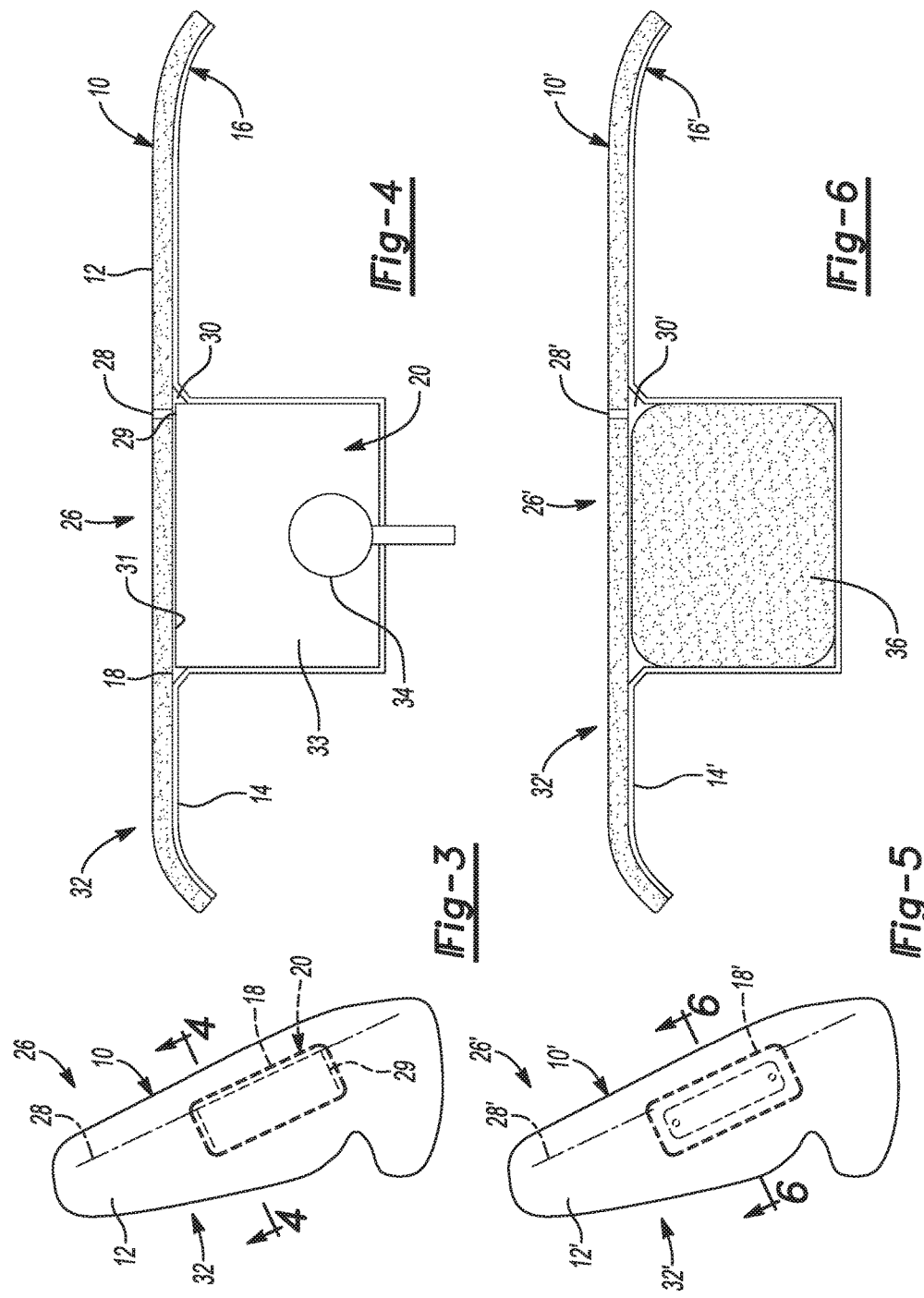

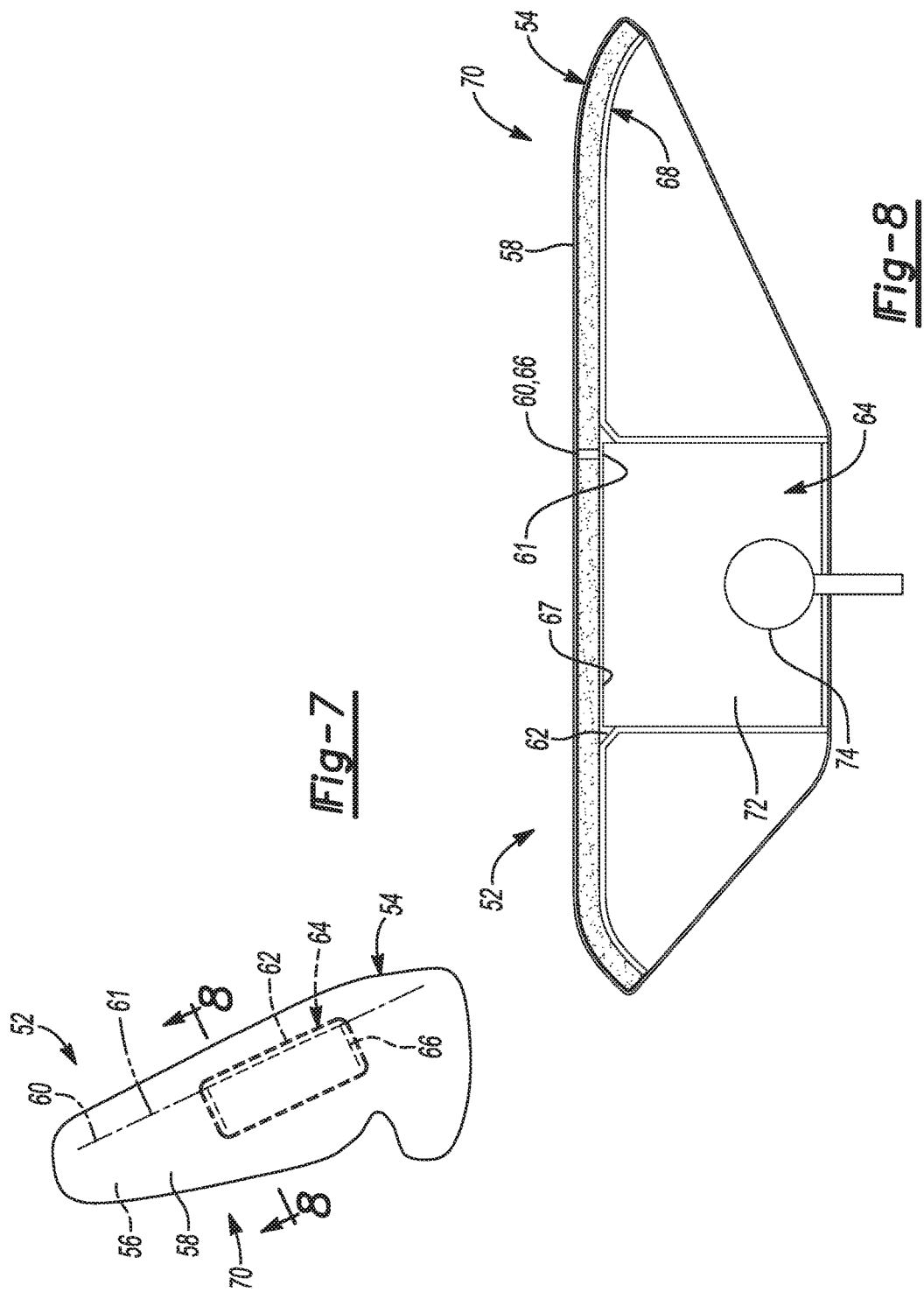

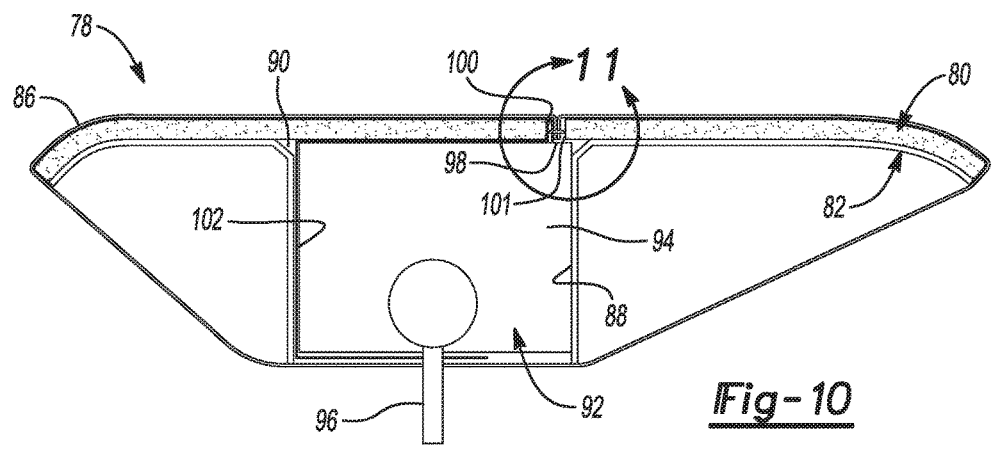
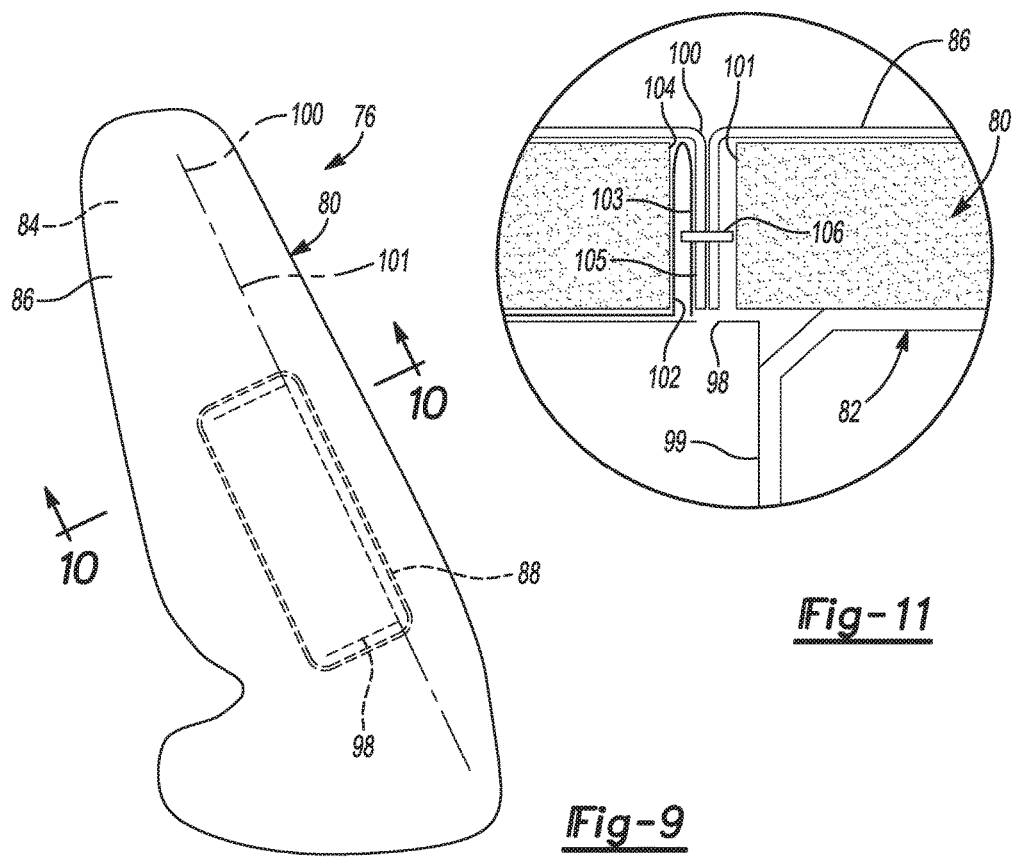

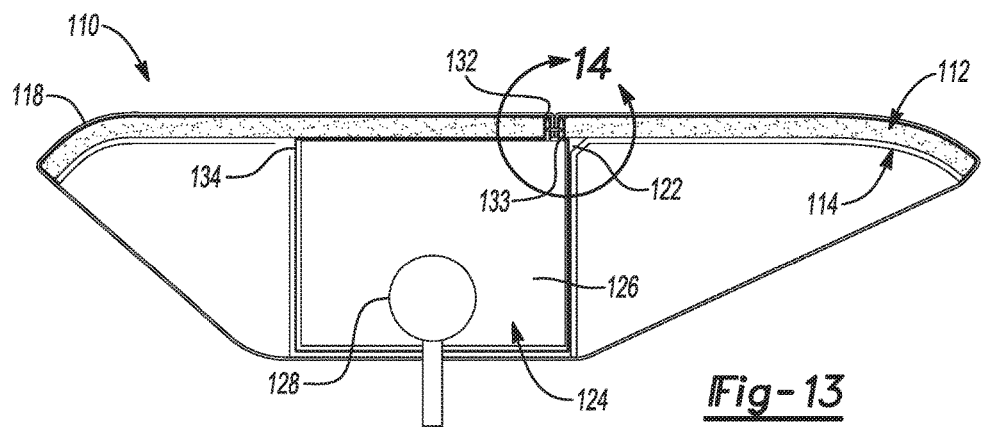
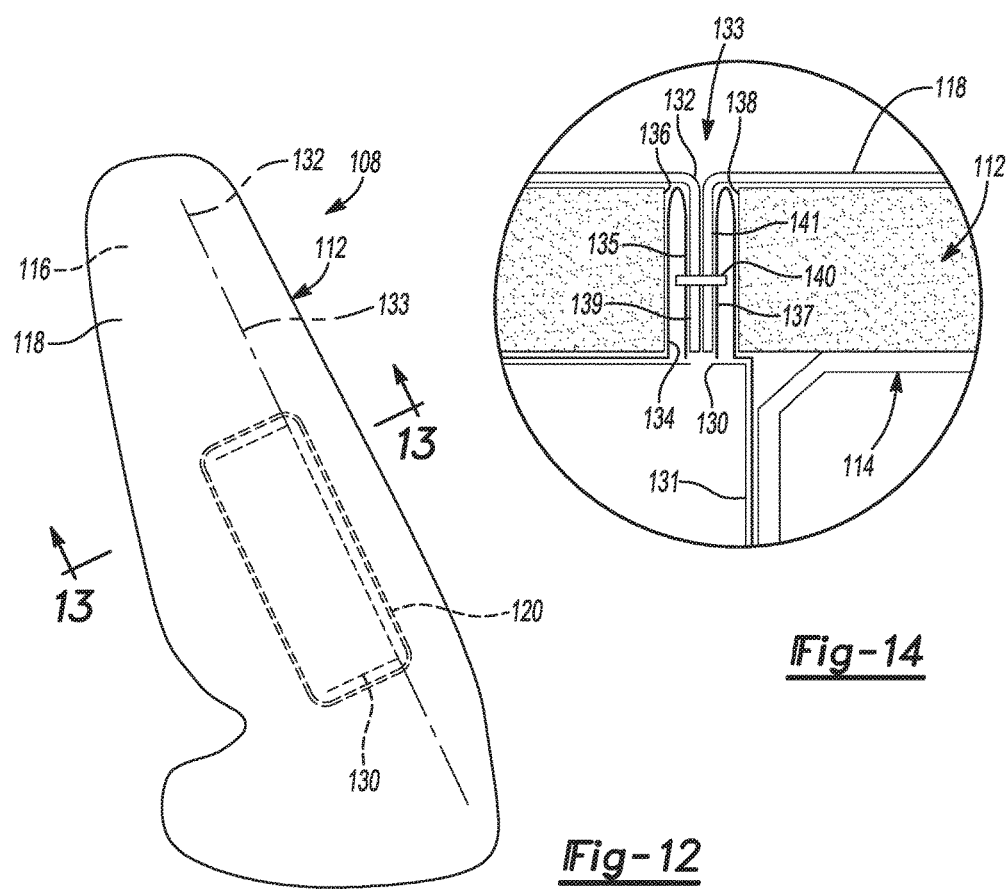

AIRBAG SYSTEM FOR A VEHICLE

CROSS-REFERENCE TO RELATED APPLICATIONS

This application claims priority to DE application 20 2016 105 511.3 filed Oct. 5, 2016, and claims the benefit of U.S. provisional application Ser. No. 62/240,697 filed Oct. 13, 2015, the disclosures of which are hereby incorporated in their entirety by reference herein.

TECHNICAL FIELD

The present disclosure relates to an airbag system for a vehicle.

BACKGROUND

Many modern vehicles contain airbags disposed in various locations throughout the vehicle interior. Different makes and models have different styles of airbags and various different trim arrangements to accommodate them. Although it may be desirable to have interior components that can be used across different vehicle platforms, this may not be possible, especially if one vehicle platform requires an airbag to be disposed within the trim component, while another vehicle platform does not. Having many different trim components may reduce efficiency and add cost to vehicle assembly.

In addition to front airbags, which may, for example, be disposed in a dashboard or steering wheel, side airbags are also used, and may be used in both front and rear seating systems. In some seating systems, a side airbag may be disposed in the seat-back side bolster, a side interior trim component such as a pillar, or both. In situations where an airbag is disposed in a side trim component, it is necessary to configure the trim component to accommodate the airbag. Thus, if one vehicle is designed to have an airbag within the side trim component, while a similar vehicle is not, two different trim components must be manufactured and inventoried to accommodate the two different vehicles. It would be desirable, therefore, to have an airbag system for a vehicle that includes a trim arrangement that could accommodate the airbag, but which could also be used in a vehicle without an airbag in the trim arrangement.

SUMMARY

At least some embodiments described herein include an airbag system for a vehicle that includes a trim component defining an outer perimeter and having an A-side configured to face into a passenger compartment of the vehicle and a B-side configured to face away from the passenger compartment. A base plate has a cavity disposed therein and is configured for attachment to the B-side of the trim component to form an at least substantially closed cavity, which is configured to receive an airbag arrangement therein. The base plate is attachable to a portion of the vehicle and has an outer perimeter generally conforming to an outer perimeter of the trim component. An airbag arrangement includes an airbag and an inflator configured to inflate the airbag, and may be disposed in the at least substantially closed cavity.

At least some embodiments described herein include an airbag system for a vehicle that includes a trim arrangement having first and second pieces which have substantially similar outer perimeters and which are attachable to each other. At least one of the first and second pieces has a cavity formed therein, and an at least substantially closed cavity is formed when the first and second pieces are attached to each other. The at least substantially close cavity is sized and shaped to accommodate an airbag arrangement.

At least some embodiments described herein include an airbag system for a vehicle that includes an airbag arrangement having an airbag and an inflator configured to inflate the airbag. A base plate defines an outer perimeter and has a cavity disposed therein for receiving the airbag system. A trim component defines an outer perimeter substantially conforming to the outer perimeter of the base plate and is attachable thereto to form an at least substantially closed cavity.

BRIEF DESCRIPTION OF THE DRAWINGS

FIGS. 1A and 1B show different sides of a trim component as part of an airbag system in accordance with embodiments described herein;

FIGS. 2A and 2B show different sides of a base plate attachable to the trim component shown in FIGS. 1A and 1B;

FIG. 3 shows an airbag system in accordance with embodiments described herein;

FIG. 4 shows a cut section of the airbag system shown in FIG. 3;

FIG. 5 shows an airbag system in accordance with embodiments described herein, wherein the trim arrangement is configured without an airbag;

FIG. 6 shows a cut section of the airbag system shown in FIG. 5;

FIG. 7 shows an airbag system in accordance with embodiments described herein;

FIG. 8 shows a cut section of the airbag system shown in FIG. 7;

FIG. 9 shows an airbag system in accordance with embodiments described herein;

FIG. 10 shows a cut section of the airbag system shown in FIG. 9;

FIG. 11 shows a detail of a portion of the airbag system shown in FIG. 10;

FIG. 12 shows an airbag system in accordance with embodiments described herein;

FIG. 13 shows a cut section of the airbag system shown in FIG. 12;

FIG. 14 shows a detail of a portion of the airbag system shown in FIG. 13.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1A shows a trim component 10 forming a part of an airbag system for a vehicle. In the embodiment shown in FIG. 1, the trim component 10 may be made from a polymer, and more particularly, may be made from a foam material. The trim component 10 includes an A-side 12 configured to face into a passenger compartment of a vehicle, and a B-side 14 configured to face away from the passenger compartment—see FIG. 1B. Although the A-side 12 may be manufactured with a finished appearance, it may also be covered with a trim material as described below and illustrated, for example, in FIGS. 7-14. The airbag system also includes a base plate 16 shown in FIGS. 2A and 2B. The base plate 16 includes a cavity 18 disposed therein, which is configured—e.g., sized and shaped—to receive an airbag arrangement 20 shown in FIG. 2B. The base plate 16 may be made from, for example, a polymeric material such as a plastic, although it may be made from other types of polymers or non-polymeric materials, depending on the requirements of the application.

As described in more detail in conjunction with FIGS. 3 and 4, the trim component 10 and the base plate 16 are configured to be attached to each other to form a trim arrangement, which may be, for example, a trim arrangement for a C-pillar or other pillar disposed in the rear portion of a vehicle. The base plate 16 may be attached with fasteners or by other methods to a pillar frame that forms a part a vehicle body, and the trim component 10 may be attached to the base plate with an adhesive or by other attachment methods. In the embodiment shown in FIGS. 1 and 2, the base plate 16 includes an outer perimeter 22 which generally conforms to an outer perimeter 24 of the trim component 10. More specifically, the outer perimeters 22, 24 of the base plate 16 and the trim component 10 do not necessarily match exactly; however, they are configured generally alike so that the two pieces 10, 16 fit together and attach to each other to form a complete trim arrangement. Thus, the trim component 10 and base plate 16 are two pieces of the trim arrangement which, as explained in more detail below, can be used in a vehicle whether or not it is desired to have an airbag disposed within it. Although the trim arrangement illustrated and described above is in the form of a side pillar, it is understood that embodiments may include different trim components within the vehicle interior.

FIG. 3 shows an airbag system 26, which includes the trim component 10 showing the A-side 12, which is configured to face the vehicle interior. Also shown in FIG. 3 is a slot 28 disposed within the trim component 10 along a length thereof, which is adjacent to or coincident with a portion of a split line 29 disposed in a hard cover 31 of the airbag arrangement 20—see FIG. 4. For embodiments in which a trim component, such as the trim component 10 is configured to be covered with a trim material, the slot 28 may be disposed all the way through the trim component—i.e., from the B-side to the A-side. In other embodiments, where the A-side of the trim component is intended to be a finished surface, a slot, such as the slot 28, may be disposed from the B-side through only a portion of the thickness of the trim component such that it does not show on the A-side.

FIG. 4 shows a sectional view of a portion of the airbag system 26, including the trim component 10 attached to the base plate 16. As described above, the trim component 10 and the base plate 16 are two pieces of a trim arrangement 32, and they may be attached to each other, for example, with an adhesive. FIG. 4 shows that when the trim component 10 is attached to the base plate 16, the B-side 14 of the trim component and the cavity 18 within the base plate 16 form a cavity 30 that is at least substantially closed. As shown in FIG. 4, the B-side surface of the trim component 10 is relatively flat and continuous over the portion that contacts the cavity 18 in the base plate 16. Disposed within the cavity 30 is the airbag arrangement 20, which includes an airbag 33 and an inflator 34 configured to inflate the airbag 33. In the embodiment shown in FIG. 4, the airbag 33 is a hardcover side airbag with a split line 29 near the slot 28. The B-side 14 of the trim component 10 may be attached to the cover 31 of the airbag 33, for example, with an adhesive.

FIGS. 5 and 6 show an airbag system 26', where the prime symbol (') is used on numerical labels to show that the elements are the same or similar to those in the previous drawing figures. The airbag system 26' includes a trim arrangement 32' having a trim component 10' and a base plate 16'. A cavity 18' in the base plate 16' cooperates with a B-side 14' of the trim component 10' to form an at least substantially closed cavity 30'. Unlike the embodiments shown in FIGS. 1-4, the cavity 30' does not have an airbag arrangement disposed within it. Rather, the cavity 18' is filled with a foam material 36 prior to the base plate 16' being attached to the trim component 10'. The foam 36 provides additional structural integrity to the trim arrangement 32'. Thus, the airbag systems 26, 26' provide a number of advantages. For example, it is possible to provide a trim arrangement 32 in a vehicle that requires a side airbag, and to provide an identical trim arrangement 32' in a vehicle that does not require a side airbag. With the first trim arrangement 32, the cavity 18 is filled with an airbag arrangement 20, and in the second trim arrangement 32', the cavity 18' is filled with a foam material, which can be easily injected and may also help the trim component 10' to adhere to the base plate 16' by forming an adhesive bond.

FIGS. 7 and 8 show an airbag system 52 that includes a trim component 54 similar to the trim component 10 shown in FIG. 1 and described above. The trim component 54 may be made from a polymeric foam material, for example, and includes an A-side 56, which as explained in more detail below, is hidden from view in FIG. 7. In this embodiment, the trim component 54 is covered by trim material 58, which may be, for example, leather or some other material that is used on the interior of the passenger compartment where the airbag system 52 is installed. The trim material 58 includes a tear seam 60 as shown in FIG. 7. The tear seam 60 is adjacent to and may be coincident with a slot 61 in the trim component. An at least substantially closed cavity 62 is formed by the attachment of the trim component 54 to a base plate 68. An airbag arrangement 64 is disposed within the cavity 62, and a split line 66 in a hard cover 67 of the airbag arrangement 64 helps to accommodate deployment of the airbag. At least a portion of the split line 66 may be coincident with or otherwise adjacent to the slot 61 and the tear seam 60. As shown in FIG. 8, the trim component 54 and base plate 68 form a trim arrangement 70. In this embodiment, the trim arrangement 70 is almost completely surrounded by the trim material 58, which may at least partially enclose a backside of the base plate 68. Also shown in FIG. 8, is the airbag arrangement 64, which includes an airbag 72 and an inflator 74.

FIGS. 9-11 show another embodiment of an airbag system 76 configured similarly to the airbag systems illustrated and described above. The airbag system 76 includes a trim arrangement 78 made up of a trim component 80 and a base plate 82. The trim component 80 may also be made from a polymer, such as a foam or other material, and includes an A-side 84, which, like the embodiment illustrated in FIG. 7, is hidden from view in FIG. 9 because it is at least partially surrounded by a trim material 86. A cavity 88 is formed in the base plate 82, and when the base plate 82 is attached to the trim component 80 an at least substantially closed cavity 90 is formed—see FIG. 10. The cavity 90 holds an airbag arrangement 92, which includes an airbag 94 and an inflator 96. The airbag 94 is a hardcover airbag, and is deployed through a split line 98 in a cover 99 of the airbag arrangement 92, a slot 101 in the trim component 80, and a tear seam 100 in the trim material 86. An inner panel 102 is disposed within the cavity 90 and is disposed around at least a part of the airbag 94 to facilitate deployment of the airbag 94.

FIG. 11 shows a close-up view of the split line 98, the tear seam 100, the slot 101, and the connection between the trim material 86 and the inner panel 102. In this embodiment, the inner panel 102 has a first end 103 that is disposed adjacent to a first edge 104 of the trim component 80, while an end 105 of the trim material 86 overlaps the first end 103 of the inner panel 102; different configurations may also be used. As shown in FIG. 11, the tear seam 100 is formed by sewing together the ends of the trim material 86 and the end 103 of the inner panel 102 with stitching 106. The inner panel 102 is made from a material that is relatively inflexible, and as the airbag 94 deploys, the inner panel 102 will help direct it toward the tear seam 100.

FIGS. 12-14 show another embodiment of an airbag system 108 configured similarly to the airbag systems illustrated and described above. The airbag system 108 includes a trim arrangement 110 made up of a trim component 112 and a base plate 114. Like the other trim components described above, the trim component 112 may be made from a polymeric or other material and includes an A-side 116. The A-side 116 is hidden from view in FIG. 12 because it is at least partially surrounded by a trim material 118. A cavity 120 is formed in the base plate 114, and when the base plate 114 is attached to the trim component 112, an at least substantially closed cavity 122 is formed—see FIG. 13. The cavity 122 holds an airbag arrangement 124, which includes an airbag 126 and an inflator 128. The airbag 126 is a hardcover airbag, and is deployed through a split line 130 in a cover 131 of the airbag arrangement 124, a slot 133 in the trim component 112, and a tear seam 132 in the trim material 118. A chute 134 is disposed within the cavity 122 and at least partially surrounds the airbag 126 to facilitate deployment of the airbag 126.

FIG. 14 shows a close-up view of the split line 130, the tear seam 132, the slot 133, and the connection between the trim material 118 and the chute 134. Specifically, two ends 135, 137 of the chute 134 are disposed adjacent to edges 136, 138 of the trim component 112, while two ends 139, 141 of the trim material 118 overlap the ends 135, 137 of the chute 134, although different configurations may also be used. As shown in FIG. 14, the tear seam 132 is formed by sewing together the ends of the trim material 118 and two ends of the chute 134 with stitching 140. The chute 134 is made from a material that is relatively inflexible, and as the airbag 126 deploys, the chute 134 will help direct it toward the tear seam 132. As illustrated in FIGS. 5 and 6, and described above, various embodiments allow the same trim components to be used in a vehicle that requires an airbag in the trim component and in a vehicle that does not. Thus, any of the airbag systems illustrated and described above, such as the airbag systems 52, 76, 108, respectively shown in FIGS. 7, 9 and 12, could be used in vehicles that do not require an airbag disposed within the trim component. In such cases, the cavities 62, 90, 122 could be filled with a foam material such as illustrated in FIG. 6, or with some other material that would take the place of the airbag.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An airbag system for a vehicle, comprising:
   a trim component for a side pillar of the vehicle and defining an outer perimeter and having an A-side configured to face into a passenger compartment of the vehicle and a B-side configured to face away from the passenger compartment, the trim component including a slot disposed along a length thereof;
   a base plate configured for attachment to a pillar frame and having a cavity disposed therein and configured for attachment to the B-side of the trim component to form an at least substantially closed cavity and configured to receive an airbag arrangement therein, the airbag arrangement including an airbag and an inflator configured to inflate the airbag disposed in the at least substantially closed cavity, the base plate being attachable to a portion of the vehicle and having an outer perimeter generally conforming with the outer perimeter of the trim component such that the trim component and the base plate form a trim arrangement; and
   a panel disposed around at least a portion of the airbag and having a first end disposed in the slot adjacent to a first edge of the slot for directing the airbag toward the slot when the inflator inflates the airbag.

2. The airbag system of claim 1, wherein the airbag includes a hard cover having a split line disposed adjacent to the slot in the trim component when the trim component is attached to the base plate.

3. The airbag system of claim 1, further comprising a trim material disposed over the A-side of the trim component and having a first end disposed in the slot adjacent to the first end of the panel.

4. The airbag system of claim 3, wherein the panel includes a second end disposed in the slot adjacent to a second edge of the slot, and the trim material includes a second end disposed in the slot adjacent to the second end of the panel.

5. An airbag system for a vehicle, comprising:
   a trim arrangement including first and second pieces having substantially similar outer perimeters and which are attachable to each other, one of the first and second pieces including a slot disposed along a length thereof, said trim arrangement configured for attachment to a side pillar of the vehicle, and at least one of the first and second pieces having a cavity formed therein such that an at least substantially closed cavity is formed when the first and second pieces are attached to each other, the at least substantially closed cavity having an airbag arrangement disposed therein including an airbag and an inflator configured to inflate the airbag; and
   a panel disposed around at least a portion of the airbag and having a first end disposed in the slot adjacent to a first edge of the slot for directing the airbag toward the slot when the inflator inflates the airbag.

6. The airbag system of claim 5, wherein the airbag includes a hard cover having a split line disposed adjacent to the slot when the first and second pieces are attached to each other.

7. The airbag system of claim 5, further comprising a trim material disposed over one of the first and second pieces and having a first end disposed in the slot adjacent to the first end of the panel.

8. The airbag system of claim 7, wherein the panel includes a second end disposed in the slot adjacent to a second edge of the slot, and the trim material includes a second end disposed in the slot adjacent to the second end of the panel.

9. An airbag system for a vehicle, comprising:
- an airbag arrangement including an airbag and an inflator configured to inflate the airbag;
- a base plate defining an outer perimeter configured for attachment to a side pillar of the vehicle and having a cavity disposed therein configured to receive the airbag arrangement;
- a trim component defining an outer perimeter substantially conforming to the outer perimeter of the base plate and attachable thereto to form an at least substantially closed cavity, the trim component including a slot disposed along a length thereof, and wherein the airbag arrangement is disposed in the at least substantially closed cavity between the trim component and the base plate; and
- a panel disposed around at least a portion of the airbag and having a first end disposed in the slot adjacent to a first edge of the slot for directing the airbag toward the slot when the inflator inflates the airbag.

10. The airbag system of claim 9, wherein the airbag includes a hard cover having a split line disposed adjacent to the slot when the base plate and the trim component are attached to each other.

11. The airbag system of claim 9, further comprising a trim material disposed over the trim component and having a first end disposed in the slot adjacent to the first end of the panel.

12. The airbag system of claim 11, wherein the panel includes a second end disposed in the slot adjacent to a second edge of the slot, and the trim material includes a second end disposed in the slot adjacent to the second end of the panel.

* * * * *